US005162999A

United States Patent [19]

Wild et al.

[11] Patent Number: 5,162,999

[45] Date of Patent: Nov. 10, 1992

[54] PROCESS AND DEVICE FOR ADJUSTING OPERATING PARAMETERS OF AN INTERNAL COMBUSTION ENGINE

[75] Inventors: Ernst Wild, Oberriexingen; Gerhard Schneider, Ditzingen, both of Fed. Rep. of Germany

[73] Assignee: Robert Bosch GmbH, Stuttgart, Fed. Rep. of Germany

[21] Appl. No.: 466,293

[22] PCT Filed: Jul. 21, 1989

[86] PCT No.: PCT/DE89/00485

§ 371 Date: Apr. 4, 1990

§ 102(e) Date: Apr. 4, 1990

[87] PCT Pub. No.: WO90/01629

PCT Pub. Date: Feb. 22, 1990

[30] Foreign Application Priority Data

Aug. 4, 1988 [DE] Fed. Rep. of Germany ....... 3826526

[51] Int. Cl.[5] ......................... G06F 9/46; G06F 15/20

[52] U.S. Cl. .......................... 364/431.11; 364/431.05; 395/650

[58] Field of Search .............. 364/200, 431.03, 431.04, 364/431.05, 431.11

[56] References Cited

U.S. PATENT DOCUMENTS 4,337,513 6/1982 Furuhashi .......................... 364/200
4,482,962 11/1984 Amano et al. ...................... 364/200
4,740,915 4/1988 Bonitz et al. ........................ 364/900
4,831,536 5/1989 Yakuwa .......................... 364/431.03
4,954,948 9/1990 Hira et al. ...................... 364/431.11

FOREIGN PATENT DOCUMENTS 51152716 1/1979 Japan .
2058406 4/1981 United Kingdom .
2184570 6/1987 United Kingdom .

*Primary Examiner*—Vincent N. Trans
*Attorney, Agent, or Firm*—Walter Ottesen

[57] ABSTRACT

The invention relates to a method and a device for adjusting operating parameters of an internal combustion engine. Time-independent programs are executed in a low-priority background program and programs dependent on the crank angle are executed in a high-priority synchroprogram. Time-dependent programs are divided into different groups, specifically into at least one group of time-dependent programs of shortest interval and at least one composite group which contains the group of time-dependent programs of shortest interval. When a predetermined grid interval has elapsed, a particular group of time-dependent programs, that is either a group of time-dependent programs of shortest interval or a composite group, is run through.

13 Claims, 2 Drawing Sheets

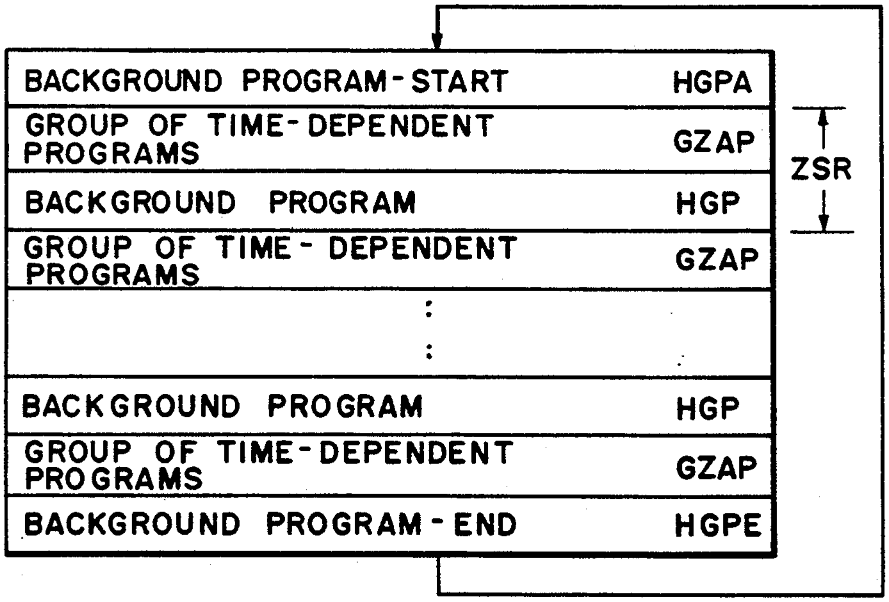
FIG. 1 (STATE OF THE ART)
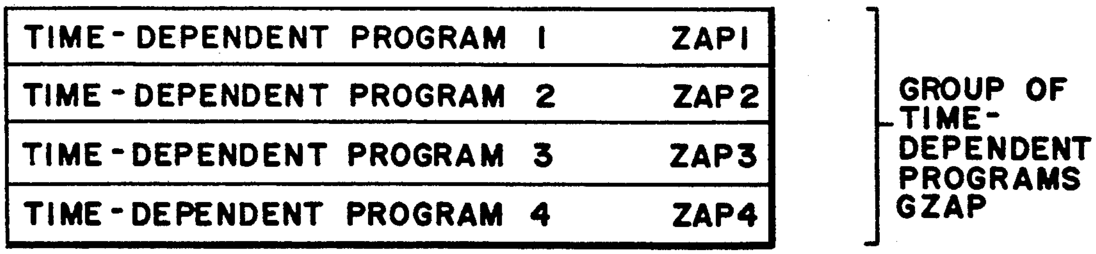
FIG. 2 (STATE OF THE ART)

GAKP = GROUP OF TIME-DEPENDENT PROGRAMS OF SHORTEST INTERVAL

VG1, VG2 = COMPOSITE PROGRAMS

PROCESS AND DEVICE FOR ADJUSTING OPERATING PARAMETERS OF AN INTERNAL COMBUSTION ENGINE

FIELD OF THE INVENTION

The invention relates to a method and a device for setting operating parameters, especially the ignition angle and/or the lambda value of an internal combustion engine.

BACKGROUND OF THE INVENTION

In a device for setting operating parameters of an internal combustion engine, programs of differing priority in time are executed. High-priority programs are all those which must ensure that, at a specific crank angle, a specific operation is triggered, for example ignition takes place or the injection of fuel is started or this operation is terminated. These programs therefore as a rule synchronize operations with the crankshaft rotation. These programs, which are very short and which are started in dependence on the crankshaft, taken as a whole are referred to in the following as synchroprogram. In contrast to the synchroprogram in terms of priority are programs which, for example, evaluate characteristic fields or characteristic lines in order to prepare initial values for programs of higher priority. Such low-priority programs taken as a whole are referred to in the following as a background program. Between the background program and the synchroprogram in terms of priority there is a group of time-dependent programs which serve mainly for any integration purposes. It is important for these programs that they are called up at time intervals adhered to as closely as possible, and during each execution a value, for example the integral value of the regulating quantity for adjusting the lambda value, is increased or decreased by a predetermined count value. Since the count value is fixed, a desired integration speed can be achieved only when the time interval between two integration steps is as constant as possible.

The execution of the background program HGP from its start HGPA to its end HGPE and of the group of time-dependent programs GZAP according to the state of the art is shown in FIG. 1. The group of time-dependent programs GZAP and parts of the background program HGP are run through alternately. During the execution of the background program, a check is made as to whether a timer has set a flag which indicates that a predetermined grid interval ZSR has expired since the last start of the group of time-dependent programs. This grid interval amounts, for example, to 10 ms. In contrast, the pure running time of the group of time-dependent programs amounts, for example, to only approximately 4 ms and that of the synchroprogram to less than 1 ms. However, the run-through of the background program or of the group of time-dependent programs is interrupted repeatedly by the highest-priority synchroprogram. The result is that the actual running time of the group of time-dependent programs at a high engine speed is no longer 4 ms, but, for example 8 ms. Approximately 2 ms then remain within the grid interval for running through parts of the background program.

Methods and devices for setting operating parameters of an internal combustion engine have long been provided in the form of various extension stages. In very simple systems, only a few influencing variables are taken into account and only a few operating parameters are calculated, while in complex systems considerably more calculations take place and also learning operations of the most diverse kinds are carried out. As a consequence, the group of time-dependent programs GZAP is composed of differing numbers of time-dependent programs ZAP, for instance of four time-dependent programs ZAP1–ZAP4 in the example according to FIG. 2. The more programs are accommodated within the group of time-dependent programs GZAP, the more time is taken to run through this group. The state of the art took this into account by increasing the grid interval ZSR. If the pure running time of the group amounted, for example, to 6 ms instead of the above-mentioned 4 ms, resulting at a high engine speed in a genuine running time of 12 ms instead of 8 ms, the grid interval ZSR was fixed, for example, at 14 ms. Such a lengthening of the grid interval was possible and is still possible without difficulty, since the mentioned times are sufficiently short by far to make it possible to run through time-dependent operations with sufficient accuracy. However, changing the grid interval gives rise to the disadvantage that it is necessary to match operating parameters to the changed grid interval, for example the counting steps in integration operations. The practical use of the method and device in an internal combustion engine, namely the so-called application, therefore is relatively complex.

It is the object of the invention to provide an easily applicable device and an easily applicable method for setting operating parameters of an internal combustion engine.

SUMMARY OF THE INVENTION

The method according to the invention and the device according to the invention are characterized in that the time-dependent programs are no longer collected in a single group, but are divided into different groups, namely at least into a program group of shortest interval and programs of longer interval, and in that at least one of the programs of longer interval is added to the program group of shortest interval, thereby forming at least one composite group.

How many programs are combined in the program group of shortest interval and how many programs are added to form a particular composite group depends on the predetermined grid interval and on the running time of the individual programs. It is advantageous to select the pure running time of the longest-running composite group only so high that, even when it is frequently interrupted by the synchroprogram at a very high engine speed, it still does not completely fill the grid interval, that is it still leaves some time for the further run-through of the background program during each grid interval.

In the method according to the invention and the device according to the invention, systems calculating different numbers of parameters are no longer distinguished in that different grid intervals are used, but in that, for the same grid interval, the more composite groups are formed, the more different computing operations must then be executed. As in the state of the art, time-dependent programs are started when the predetermined grid interval has elapsed. However, these programs are no longer for one group of all the time-dependent programs, instead, these programs are for different groups mentioned above.

It is especially advantageous for programming reasons to ensure that the process is carried out, in such a way that, in a first program-processing segment of time-dependent programs, only the program group of shortest interval is called up and run through and, in a subsequent second program-processing segment of time-dependent programs, only composite groups are called up and run through, and first and second segments succeed one another continuously.

As mentioned above, during the execution of the main program a continuous check is made as to whether the flag indicating that the grid interval has elapsed has been set. Now the high-priority synchroprogram is to be run through precisely when this check is taking place. The start of the time-dependent programs is then delayed. Such a delay can occur even at extremely high engine speeds, at which the run-through of the time-dependent programs is interrupted by the synchroprogram so often that the total running time of at least the longest-running composite group exceeds the grid interval. In a further embodiment of the invention, this delay is measured by a timekeeping device, and when this delay exceeds a predetermined value the run-through of a program group of shortest interval is omitted. In this way, these delays have scarcely any effect on integration operations carried out by composite-group programs.

BRIEF DESCRIPTION OF THE DRAWINGS

The invention is explained in more detail below by means of exemplary embodiments illustrated by FIGS. 3 to 5. Of these:

FIG. 1 shows a diagram relating to the flow sequence of different programs in the state of the art;

FIG. 2 shows a time diagram relating to the combination of time-dependent programs in the state of the art;

DESCRIPTION OF THE PREFERRED EMBODIMENTS OF THE INVENTION

Figure 3:
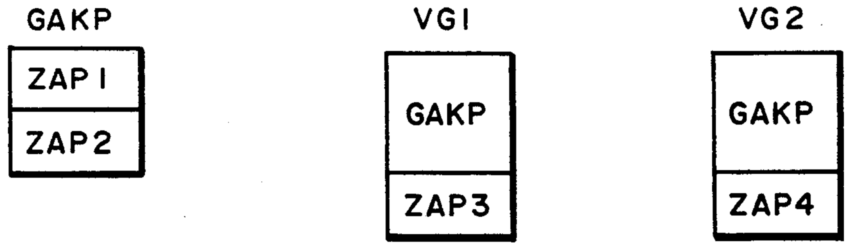
FIG. 3 shows diagrams relating to the division of time-dependent programs into different groups.

As already explained, in the method according to the invention and the device according to the invention the time-dependent programs are combined in different groups. In the illustration of FIG. 3, it is assumed as in FIG. 2, that there are altogether four time-dependent programs ZAP1–ZAP4. In the example, it is assumed that the time-dependent programs ZAP1 and ZAP2 are combined to form a group GAKP of time-dependent programs of shortest interval. This can be, for example, a program for computing the integral value of a lambda controller and a program for integrating the signal of the lambda probe for a lean-burn engine. It is advantageous to update the mentioned parameters relatively frequently, and therefore these should be called up after each grid interval has elapsed, that is, at the shortest possible interval. In contrast, the programs ZAP3 and ZAP4 will be, for example, programs for compensating disturbing variables by learning processes, for example for compensating a multiplicative or additive error in the injection time. It is sufficient to call up these programs less often and use for them correspondingly longer counting steps in integration operations than would be used if the corresponding programs were called up after each grid interval had elapsed. The combination of the group GAKP of time-dependent programs of shortest interval with the time-dependent program 3 is designated as a composite group VG1, and the combination of GAKP with the time-dependent program 4 is designated as a composite group VG2.

The simplest embodiment of a device according to the invention and of a method according to the invention operate by alternately running through, at the start of each grid interval, the group GAKP of time-dependent programs of shortest interval, the composite group VG1 and the composite group VG2. The background program HGP continues to run within the times of the grid interval in which the above group programs do not run. All these programs are each interrupted by the synchroprogram.

Figure 4:
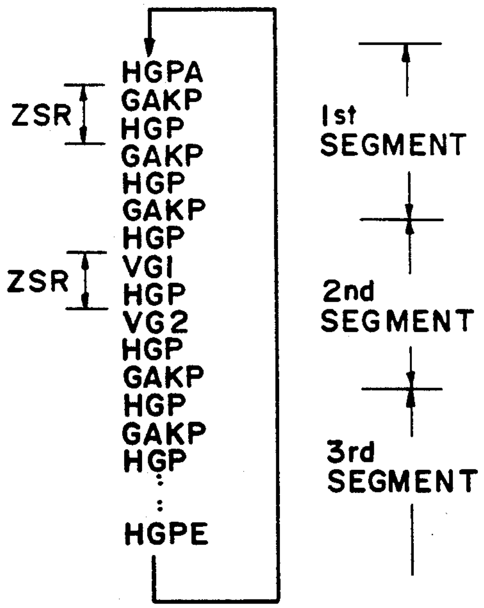
FIGS. 4 and 5 show diagrams relating to two embodiments of the sequence of different groups of time-dependent programs.

An embodiment which is more advantageous for programming reasons is shown in FIG. 4. In a first time segment, only the background program HGP and the group GAKP alternate. In a second time segment, the composite groups are then also run through. In the embodiment illustrated, each segment comprises three groups of time-dependent programs, and the background program is further processed three times. In the first segment, each of the groups of time-dependent programs are formed by the group GAKP of time-dependent programs of shortest interval. In contrast, in the second segment, the three groups are the groups GAKP, VG1 and VG2. The first and second segments succeed one another alternately from the start HGPA of the main program to its end HGPE.

Figure 5:
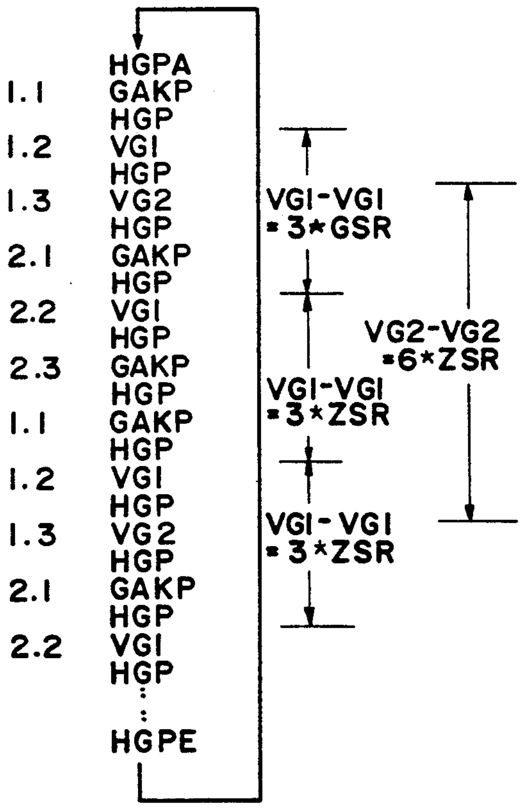

FIG. 5 shows an embodiment, in which the groups GAKP, VG1 and VG2 are started at different intervals. The group of time-dependent programs of shortest interval is once again started when each grid interval ZSR has elapsed, either as the only group or as a subgroup within one of the composite groups VG1 or VG2. The composite group VG1 is started each time after three grid intervals ZSR and the composite group VG2 after six grid intervals ZSR.

The foregoing examples make it clear that the device according to the invention and the method according to the invention are highly flexible and make it possible to make do with the same grid interval ZSR, for example an interval of 10 ms in systems of the most diverse complexity. Over and above conventional functional means, it is necessary only to have a means which monitors the adherence to the desired run-through sequence of the groups of time-dependent programs.

Furthermore, the device according to the invention and the method according to the invention make it possible to compensate integration errors in timing means, such as occur when the interval between two starting times of groups of time-dependent programs becomes longer than the grid interval. This delay of the starting time arises unavoidably because it repeatedly happens that the high-priority synchroprogram is just then to be run through when the grid interval has elapsed and a group of time-dependent programs should be started. The result of this error can be that, for example, only 49 groups of time-dependent programs are run through when 50 grid intervals have already elapsed. This produces a deviation of actual integration values from preset integration values. In the particular example, there was too little integration over the period of one step. This error cannot be eliminated for the group of time-dependent programs of shortest interval. But it can be eliminated for the composite groups started less often, in particular if, when the sum of the intervals at which a specific composite group is called up and the expected sum of grid intervals is between one half and a full grid interval, a group GAKP of time-dependent programs of shortest interval is omitted. The integration step actually missing is thereby regained for the composite groups.

The method, according to the invention can also be used advantageously for a device which serves for the stereo control of an internal combustion engine. In stereo control, two cylinder banks of an internal combustion engine having two exhaust-gas channels, each with a lambda probe and a catalytic converter, are controlled separately. With this control, it is advantageous to regulate parameters dependent on the lambda value as individual blocks, but to use other parameters jointly, for example pilot control values or tank adaptation values. Since subprograms are to be executed separately for the two cylinder banks in this use in the device, there is, in the known method according to FIGS. 1 and 2, a long running time of the total group of time-dependent programs, and this requires a comprehensive adaptation of the integration parameters because of a very long grid interval. However, if the method according to the invention is used on such a device, here too a grid interval of, for example, 10 ms uniform for a particular system design can be maintained, with the result that there is no need to adapt integration parameters purely for reasons of program flow.

In the embodiments, it was assumed that there is only a single group GAKP of time-dependent programs of shortest interval. It is also possible, however, to provide a plurality of such groups, for example two groups of time-dependent programs of shortest interval which have no program common to them. These are then combined with further time-dependent programs, to form composite groups, and then run through so that alternately one group of time-dependent programs of shortest interval is processed and then the other, whether as an individual group or as a composite group with at least one further time-dependent program.

We claim:

1. A method of operating a computer controlled system for an internal combustion engine in which operating parameters such as ignition timing and duration of injection pulses are set as output signals, which are produced based on input signals as a result of the computer executing a plurality of task programs, each task program having a prescribed level of priority assigned thereto in accordance with its functional effect on the operation of said system, said task programs being:

(a) programs dependent on the crank angle of the crankshaft of the internal combustion engine, which are executed in a high priority synchroprogram;

(b) time-dependent programs, which are executed at a mutual interval of at least one predetermined grid interval (ZSR); and, (c) time-dependent programs which are executed in a low priority background program;

the method comprising the steps of:

separating the time-dependent programs into at least a program group (GAKP) of shortest interval and programs of longer interval;

adding at least one of the programs (ZAP3, ZAP4) of longer interval to said program group of shortest interval thereby forming at least one composite group (VG1, VG2); and, starting the program group of shortest interval or one of the composite groups when said predetermined grid interval (ZSR) has elapsed and the previously started group of time-dependent programs of shortest interval or composite group has run through.

2. The method of claim 1, wherein different composite groups are called up at different, predetermined intervals and then run through; and, each of said predetermined intervals being a multiple of said predetermined grid interval (ZSR).

3. The method of claim 2, wherein said multiple is a whole number multiple.

4. The method of claim 1, wherein said shortest interval and said longer interval are each less than said grid interval.

5. The method of claim 4, wherein said grid interval is approximately 10 ms.

6. A method of operating a computer controlled system for an internal combustion engine in which operating parameters such as ignition timing and duration of injection pulses are set as output signals, which are produced based on input signals as a result of the computer executing a plurality of task programs, each task program having a prescribed level of priority assigned thereto in accordance with its functional effect on the operation of said system, said task programs being:

(a) programs dependent on the crank angle of the crankshaft of the internal combustion engine, which are executed in a high priority synchroprogram;

(b) time-dependent programs, which are executed at a mutual interval of at least one predetermined grid interval (ZSR); and, (c) time-dependent programs which are executed in a low priority background program;

the method comprising the steps of:

separating the time-dependent programs into at least a program group (GAKP) of shortest interval and programs of longer interval;

adding at least one of the programs (ZAP3, ZAP4) of longer interval to said program group of shortest interval thereby forming at least one composite group (VG1, VG2);

starting the program group of shortest interval or one of the composite groups when said predetermined grid interval (ZSR) has elapsed and the previously started group of time-dependent programs of shortest interval or composite group has run through;

calling up different ones of said composite groups at different, predetermined intervals and then running through the called ones of said composite groups, said predetermined intervals each being a multiple of said predetermined grid interval (ZSR);

the sum of the intervals in which a specific composite group is called up being measured and compared with an expected sum of grid intervals and, when the difference of the sums amounts to between one half and a full grid interval, a group of time-dependent programs of shortest interval (GAKP) is omitted; and, said sum of the intervals being the actual time spacing between a first call up of said specific composite group and a second call up of said specific composite group.

7. A method of operating a computer controlled system for an internal combustion engine in which operating parameters such as ignition timing and duration of injection pulses are set as output signals, which are produced based on input signals as a result of the computer executing a plurality of task programs, each task program having a prescribed level of priority assigned thereto in accordance with its functional effect on the operation of said system, said task programs being:

(a) programs dependent on the crank angle of the crankshaft of the internal combustion engine, which are executed in a high priority synchroprogram;

(b) time-dependent programs, which are executed at a mutual interval of at least one predetermined grid interval (ZSR); and, (c) time-dependent programs which are executed in a low priority background program;

the method comprising the steps of:

separating the time-dependent programs into at least a program group (GAKP) of shortest interval and programs of longer interval;

adding at least one of the programs (ZAP3, ZAP4) of longer interval to said program group of shortest interval thereby forming at least one composite group (VG1, VG2);

starting the program group of shortest interval or one of the composite groups when said predetermined grid interval (ZSR) has elapsed and the previously started group of time-dependent programs of shortest interval or composite group has run through; and, in a first program-processing segment of time-dependent programs, calling up and running through only the group of time-dependent programs of shortest interval; and, in a subsequent second program-processing segment of time-dependent programs, calling up and running through only composite groups with said first and second program processing segments succeeding one another continuously.

8. The method of claim 7, wherein the sum of the intervals in which a specific composite group is called up is measured and compared with an expected sum of grid intervals and, when the difference of the sums amounts to between one half and a full grid interval, a group of time-dependent programs of shortest interval (GAKP) is omitted; and, said sum of the intervals being the actual time spacing between a first call up of said specific composite group and a second call up of said specific composite group.

9. A method of operating a computer controlled system for an internal combustion engine in which operating parameters such as ignition timing and duration of injection pulses are set as output signals, which are produced based on input signals as a result of the computer executing a plurality of task programs, each task program having a prescribed level of priority assigned thereto in accordance with its functional effect on the operation of said system, said task programs being:

(a) programs dependent on the crank angle of the crankshaft of the internal combustion engine, which are executed in a high priority synchroprogram;

(b) time-dependent programs, which are executed at a mutual interval of at least one predetermined grid interval (ZSR); and, (c) time-dependent programs which are executed in a low priority background program;

the method comprising the steps of:

separating the time-dependent programs into at least a program group (GAKP) of shortest interval and programs of longer interval;

adding at least one of the programs (ZAP3, ZAP4) of longer interval to said program group of shortest interval thereby forming at least one composite group (VG1, VG2);

starting the program group of shortest interval or one of the composite groups when said predetermined grid interval (ZSR) has elapsed and the previously started group of time-dependent programs of shortest interval or composite group has run through;

measuring and comparing the sum of the intervals in which a specific composite group is called up with an expected sum of grid intervals and, when the difference of the sums amounts to between one half and a full grid interval, omitting a group of time-dependent programs of shortest interval (GAKP); and, said sum of the intervals being the actual time spacing between a first call up of said specific composite group and a second call up of said specific composite group.

10. A device for operating a computer controlled system for an internal combustion engine, in which operating parameters such as ignition timing and duration of injection pulses are set as output signals, which are produced based on input signals as a result of the computer executing a plurality of task programs, each task program having a prescribed level of priority assigned thereto in accordance with its functional effect on the operation of said system, said task programs being:

(a) programs dependent on the crank angle of the crankshaft of the internal combustion engine, which are executed in a high priority synchroprogram;

(b) time-dependent programs, which are executed at a mutual interval of at least one predetermined grid interval (ZSR); and, (c) time-dependent programs which are executed in a low priority background program;

the device comprising:

time-dependent programs (ZAP1–ZAP4) are divided into different groups, namely into at least one group of time-dependent programs of shortest interval (GAKP) and programs of longer interval (ZAP3, ZAP4);

at least one of the programs of longer interval being added to the group of time-dependent programs of shortest interval thereby forming at least one composite group (VG1, VG2); and, means for starting the program group of shortest interval or one of the composite groups when said predetermined grid interval has elapsed and the previously started group of time-dependent programs of shortest interval or composite group is run through.

11. The device of claim 10, wherein said shortest interval and said longer interval are each less than said predetermined grid interval.

12. The device of claim 11, wherein said predetermined grid interval is approximately 10 ms.

13. A device for operating a computer controlled system for an internal combustion engine, in which operating parameters such as ignition timing and duration of injection pulses are set as output signals, which are produced based on input signals as a result of the computer executing a plurality of task programs, each task program having a prescribed level of priority assigned thereto in accordance with its functional effect on the operation of said system, said task programs being:

(a) programs dependent on the crank angle of the crankshaft of the internal combustion engine, which are executed in a high priority synchroprogram;

(b) time-dependent programs, which are executed at a mutual interval of at least one predetermined grid interval (ZSR); and, (c) time-dependent programs which are executed in a low priority background program;

the device comprising:

time-dependent programs (ZAP1–ZAP4) are divided into different groups, namely into at least one group of time-dependent programs of shortest interval (GAKP) and programs of longer interval (ZAP3, ZAP4);

at least one of the programs of longer interval being added to the group of time-dependent programs of shortest interval thereby forming at least one composite group (VG1, VG2);

means for starting the program group of shortest interval or one of the composite groups when said predetermined grid interval has elapsed and the previously started group of time-dependent programs of shortest interval or composite group is run through; and, said device being adapted for setting the operating parameters of an internal combustion engine with two cylinder banks and two separate exhaust-gas channels, each with a lambda probe and a catalytic converter, and for this purpose, the device further comprises means for causing various time-dependent programs to be executed twice, namely once for each cylinder bank, within a program segment.

* * * * *